United States Patent [19]
Benedict

[11] 3,923,415
[45] Dec. 2, 1975

[54] STEAM TURBINE EROSION REDUCTION BY ULTRASONIC ENERGY GENERATION

[75] Inventor: Robert P. Benedict, Media, Pa.

[73] Assignee: Westinghouse Electric Corporation, Pittsburgh, Pa.

[22] Filed: June 13, 1974

[21] Appl. No.: 479,056

[52] U.S. Cl.............. 415/1; 415/121 R; 415/168; 219/102
[51] Int. Cl.²...................... F01D 5/28; F01D 17/08
[58] Field of Search.............. 415/121 R, 168, 1; 259/DIG. 44; 239/102; 219/201

[56] References Cited
UNITED STATES PATENTS

| 2,651,148 | 9/1953 | Carwile | 259/DIG. 44 |
| 2,738,173 | 3/1956 | Massa | 259/DIG. 44 |
| 2,765,153 | 10/1956 | Gielow et al. | 259/DIG. 44 |
| 2,853,638 | 9/1958 | Bonnano | 415/121 |
| 3,067,948 | 12/1962 | Lang et al. | 259/DIG. 44 |
| 3,072,808 | 1/1963 | Plesset et al. | 259/DIG. 44 |
| R25,119 | 1/1962 | Rawding | 259/DIG. 44 |

Primary Examiner—Henry F. Raduazo
Attorney, Agent, or Firm—F. A. Winans

[57] ABSTRACT

In an axial flow steam turbine, erosion of stationary and rotating blade structures is minimized by directing ultrasonic energy at the steam flow in the steam flow path from an annular array of ultrasonic energy generators disposed in the turbine casing, to acoustically disperse water droplets therein.

5 Claims, 2 Drawing Figures

STEAM TURBINE EROSION REDUCTION BY ULTRASONIC ENERGY GENERATION

BACKGROUND OF THE INVENTION

1. Field of the Invention

This invention relates to generally steam turbines and more particularly to water droplet dispersal arrangements for minimizing blade erosion.

2. Description of the Prior Art

Steam turbine power plants are subject to costly blade erosion damage by condensate, or moisture droplets, formed by the motive steam as it undergoes expansion and cooling to the saturated or wet steam state. The efficiency of the turbine is also reduced by excessive moisture therein. The efficiency of each stage is reduced by about 1.15 percent for each 1 percent moisture present in the steam.

The moisture droplets collect on the trailing edges of the nozzle blades, and are swept off the nozzle blades by steam passing thereby. The droplets are large and move at relatively low velocities compared to the velocity of the tips of the rotating blades. Thus, as the large water droplets and rotating blades collide, the impact is high resulting in erosion of the rotating blades.

Since the leading edges of the rotating blades of the low pressure stages are the primary erosion area, it has been common practice to coat or form the tip of these blades of some hard material, such as stellite; however, providing erosion resistant edges is expensive, is not always adequate, and may weaken the blades. The rotating blades of the low pressure stages of the turbine may also be protected by providing a suction slot adjacent the trailing edge of each of the nozzle blades, with the slots being connected directly to a condenser to draw the water directly to the condenser. This, however, also causes some steam, which could do useful work, to also be extracted from the motive steam flow. Increasing the spacing between the rotating blades and the nozzle blades will increase the velocity of the water droplets and reduce the impact velocity of the water droplets as they impinge on the rotating blades. This however, excessively increases the turbine weight, length and cost.

A further attempt at reducing moisture damage has included U.S. Pat. No. 3,754,836 wherein dry steam is injected into the turbine to protect vulnerable areas therein from excessive erosion damage. U.S. Pat. No. 3,546,881 to R. D. Brown and assigned to the present assignee defines a vapor turbine power plant that divides the expanded motive fluid of a turbine, into a wet stream and a dry stream wherein the wet stream is delivered to a dryer before being delivered to a second turbine. The U.S. Pat. No. 3,697,191 to Heymann and assigned to the present assignee, describes a method of erosion control in a steam turbine wherein several ports on the trailing edge of a stationary nozzle blade are connected by a passageway, moisture being drawn therethrough to disperse radially inwardly at the base of the rotating blade where tangential velocity and hence erosive effects are lower. Yet another U.S. Pat. No. 3,724,967 to Fischer describes a moisture removal device for a steam turbine comprising interconnecting cavities in the stationary blades to remove water and steam therefrom, separating both, then reinjecting the steam toward an adjacent row of rotating blades, and the water to a drain.

An object of the present invention is to provide an alternate moisture removal arrangement wherein the moisture is dispersed into a uniform vapor.

A further object of the invention is to improve the heat transfer capabilities of the blades in the turbine.

SUMMARY OF THE INVENTION

In general, a steam turbine made in accordance with this invention has low pressure stages operable by steam having water droplets therein, and has a rotor, a plurality of annular arrays of circumferentially spaced rotatable blades fastened to the rotor, and an annular array of circumferentially spaced stationary guide vanes or nozzle blades fastened to the casing for directing steam against the rotatable blades. Acoustic dispersion equipment, in this case, ultrasonic transducers and associated horns, are mounted in annular arrays within the casing, directed towards the hot motive fluid flow path. The transducers may be located in the casing between adjacent stationary and rotating blades or radially outwardly of only the rotating blades or only the stationary blades. The ultrasonic signal passed through the two phase fluid, steam and water droplets, will disperse the droplets of water and its vapor to yield a uniform homogeneous fog. The fluid thus being made harmless with respect to erosion of the blades in the turbine.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENTS

Figure 1:
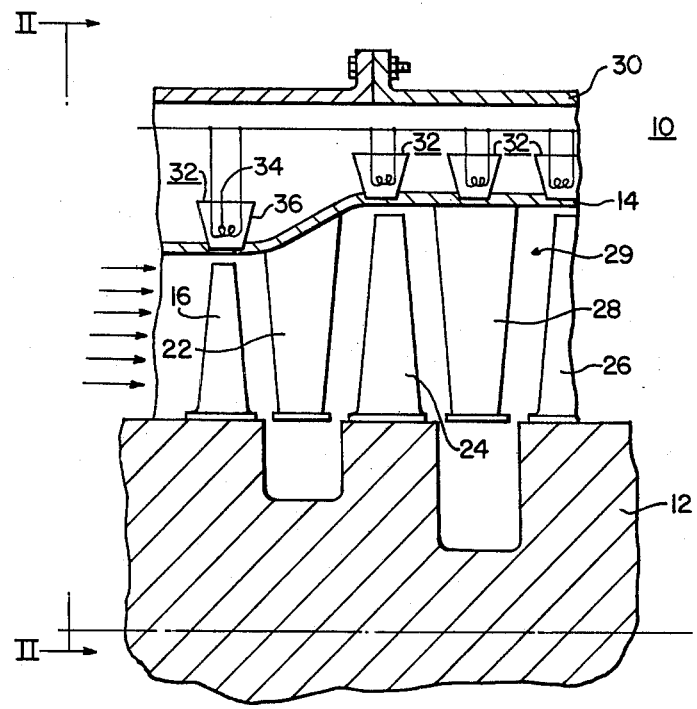
FIG. 1 is a partial axial sectional view of a turbine constructed according to the principles of the present invention.
Figure 2:
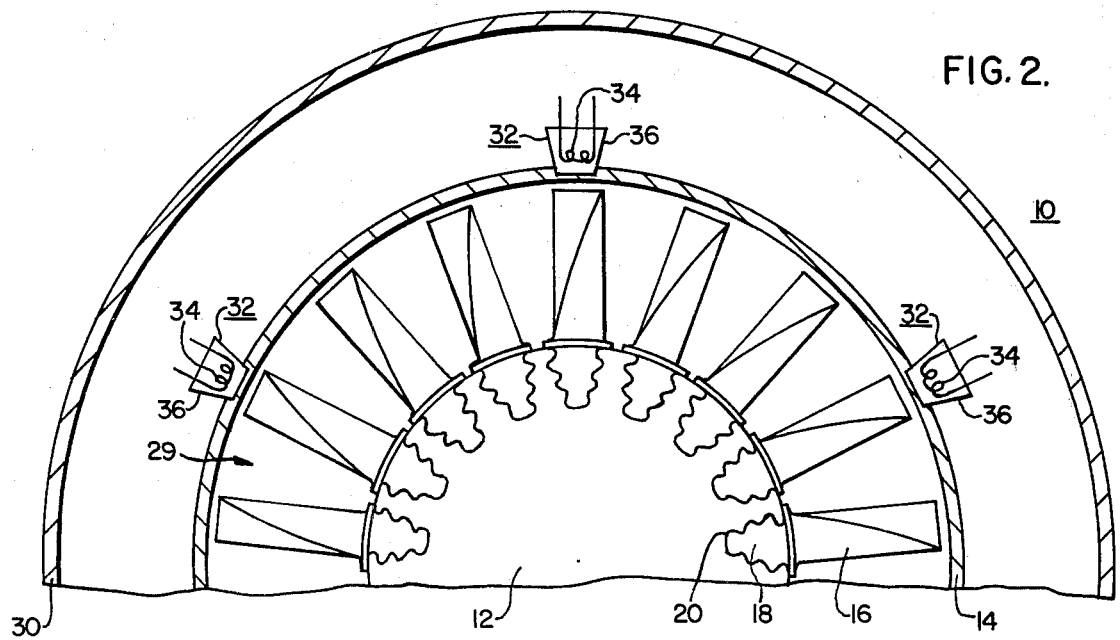
FIG. 2 is a view taken along the lines II—II of FIG. 1.

Referring to the drawings in detail, FIGS. 1 and 2 show a steam turbine 10 having a rotor 12, an inner casing 14 encircling the rotor 12, a first array of circumferentially spaced rotatable blades 16 fastened to the rotor 12 by root portions 18 in generally axially directed grooves 20 in the periphery of the rotor 12. A first array of circumferentially spaced stationary blades 22 is fastened to the inner casing 14. Shown in FIG. 1, are two additional circumferential arrays of rotating blades 24 and 26, and a second circumferential array of stationary blades 28. The space between the rotor 12 and the inner casing 14 generally defines a hot motive fluid flow path 29. An outer generally cylindrical casing 30 encircles the rotor 12 and its associated blades 16, 22. Water droplet acoustic dispersion devices 32 are disposed on the inner casing 14, and are directed towards the hot motive fluid flow path 29, causing the breakup and dispersion of water droplets and vapor in the hot steam into a homogeneous fog incapable of causing erosion on any of the blades 16, 22 in the turbine 10.

Hot motive fluid, or steam, flows between the blades 16, 22, 24 et al, from left to right as shown in the drawings of FIG. 1. The rotating and stationary blades 16, 22 et al., have a general airfoil shaped cross section. Each array of stationary blades and rotatable blades, comprises a stage of the turbine, and each turbine may have ten or more stages.

As shown in FIGS. 1 and 2, each acoustic dispersion device 32 is comprised of an ultrasonic signal generator 34 and an acoustic horn 36. In the embodiment shown, six acoustic dispersion devices 32 comprise each annular array thereof, and this number may vary. The acoustic dispersion devices 32, or ultrasonic generators, may be placed radially outwardly of the spaces between the rotating blades and the stationary blades 22; they may be placed radially outwardly of the rotating blades 24 only, or the combination thereof, as shown in FIG. 1. The ultrasonic signals produced by the ultrasonic generators 34 increases the heat transfer on the respective blades, 16 and 22, due to the vibration of the heating surface, which increases the heat transfer in forced convection. Both frequency and amplitude of vibration increase the heat transfer. The underlying purpose of the acoustic dispersion device 32 is to minimize the erosion of the blades 16 and 22. The ultrasonic generators 34 may communicate their signals through the stationary blades 22 to accomplish an acoustic dispersion of water droplets in the flow field into a fog. This is accomplished due to the fact that when an ultrasonic signal is passed through a two phase fluid, water droplets and its vapor in this example, it will disperse a highly inhomogeneous mixture of the water droplets and its vapor, to yield a uniform homogeneous fog. The moisture, being in the form of a fog, and being a particle size of 0.5 to 20 microns, will cause no significant erosion of the turbine blades. Additionally, the trajectories of water droplets need not be estimated nor taken into account designing the airfoil shaped blades 16 and 22, since a fog follows single phase vapor streamlines. The ultrasonic signals passing through the flow increase the turbulence of the flow. This means that the flow could stay attached to the blades, 16 and 22, over higher angles of attack, which would correspond to off-design conditions, with an attendant reduction in separation losses. Yet another benefit of the present invention is that measurements of temperature, pressure, flow and quality are easier to make in a fog, and, more representative or average measurements can be taken with simple sampling probes.

It is to be noted that the most detrimental water droplets are found in the vicinity of the inner casing 14, and hence, nearest the location of the acoustic dispersion devices 32 or ultrasonic generators.

Although only a basic embodiment of the invention has been shown it will be obvious to those skilled in the art after having had the benefit of seeing this invention it is not so limited, but is susceptible of various other changes and modifications without departing from the spirit and scope thereof.

I claim as my invention:

1. A steam turbine having:

a rotor including at least one row of an annular array of circumferentially spaced blades;

a casing encircling said array of rotor blades, and defining a steam flow path;

at least one row of an annular array of circumferentially spaced stationary blades attached to said casing upstream of said rotor blades and extending into said steam flow path for directing steam against said rotor blades; and, ultrasonic generator means attached to said casing exteriorly of said steam flow path for causing water droplets entrained in said steam downstream of said stationary blades to be acoustically dispersed into a fog for relatively harmless impingement upon the rotor blades.

2. A steam turbine as recited in claim 1, wheren;

said ultrasonic generator means comprises an array of individual sonic generators attached to the outer surface of said casing and in alignment with the interiorly projecting stationary blades.

3. A steam turbine as recited in claim 1, wherein;

said ultrasonic generator means comprises an array of individual sonic generators attached to the outer surface of said casing between said interiorly projecting stationary blade and said rotor blade.

4. A steam turbine as recited in claim 1, wherein;

said ultrasonic generator means comprises an array of individual sonic generators attached to the outer surface of said casing and disposed in alignment with said rotor blades.

5. A steam turbine as recited in claim 1, wherein; said ultrasonic generator means includes an array of individual circumferentially spaced acoustic horns attached to said casing for directing ultrasonic energy into said steam flow path.

* * * * *